United States Patent [19]

Schmiel

[11] 4,195,551
[45] Apr. 1, 1980

[54] HYDRAULIC CONTROL VALVE INCLUDING ELECTROMAGNETIC DETENT

[75] Inventor: Herbert H. Schmiel, Fridley, Minn.

[73] Assignee: Gresen Manufacturing Company, Minneapolis, Minn.

[21] Appl. No.: 809,473

[22] Filed: Jun. 23, 1977

[51] Int. Cl.² .................. F16K 31/06; F16K 31/44
[52] U.S. Cl. .................. 91/358 A; 251/68; 251/297
[58] Field of Search ............ 91/358 A; 251/68, 297

[56] References Cited

U.S. PATENT DOCUMENTS

| | | | |
|---|---|---|---|
| 2,331,108 | 10/1943 | Ganahl | 91/358 A |
| 2,910,079 | 10/1959 | Beeghly | 251/68 |
| 3,196,320 | 7/1965 | Manting | 361/144 |
| 3,602,245 | 8/1971 | Meisel | 251/297 |
| 3,667,723 | 6/1972 | Schneider | 91/358 A |
| 3,790,129 | 2/1974 | Pauls | 91/358 A |
| 3,823,647 | 7/1974 | Campbell et al. | 91/358 A |

*Primary Examiner*—Paul E. Maslousky
*Attorney, Agent, or Firm*—Merchant, Gould, Smith, Edell, Welter & Schmidt

[57] ABSTRACT

The disclosure is directed to an electromagnetic detent assembly for use with a manually operable hydraulic control valve to maintain the control spool in a predetermined limit position. The electromagnetic force created by the electromagnetic detent can be varied by an electronic circuit commensurate with the particular hydraulic application. A "feel" mechanism is also included, indicating to the operator that further manual movement of the control valve will cause it to reach the electromagnetic detent position.

10 Claims, 2 Drawing Figures

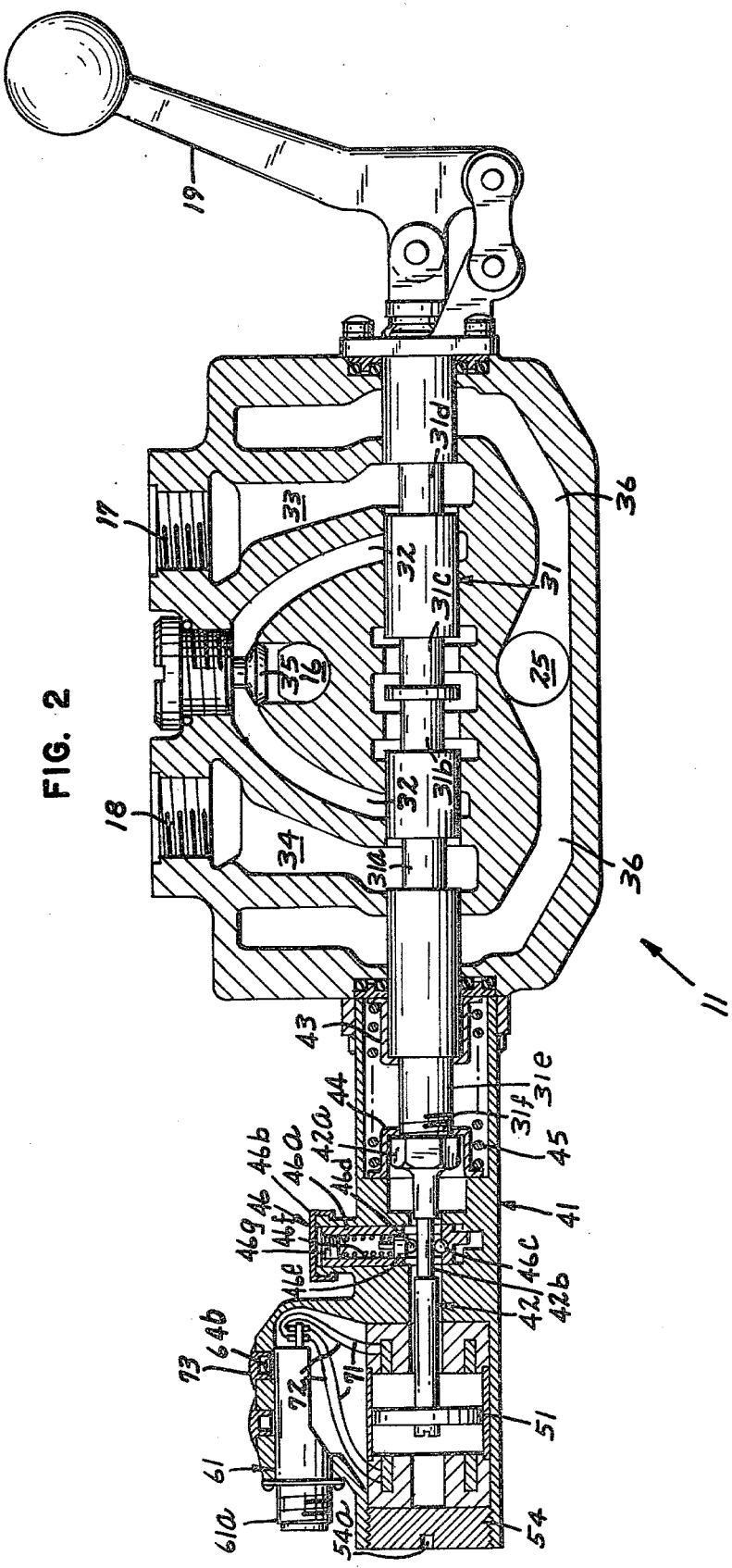

HYDRAULIC CONTROL VALVE INCLUDING ELECTROMAGNETIC DETENT

The invention is generally related to hydraulic control devices, and is specifically directed to a hydraulic control valve having a variable electromagnetic detent.

Detents for manually operable hydraulic control valve have long been used to maintain the valve in one or more selected positions, thus enabling the operator to remove his hand from the control handle and at the same time keep the hydraulic system in a particular state. They are particularly useful in maintaining the hydraulic valve in a limit position against the bias of a centering spring which normally urges the valve control element to a centered, neutral position.

In cases such as these, however, the force of the detent must be commensurate with that of the centering spring. If the detent force is insufficient, it cannot maintain the valve control element in a limit position against the stronger force of the centering spring. On the other hand, if the detent force is too large relative to the centering spring force, it is difficult for the operator to move the valve out of the limit position.

For this reason, the traditional approach to adding a detent feature to a hydraulic control valve has been on a model-by-model basis, designing the detent force relative to the size of the centering spring (and any other existing forces), which itself is chosen for the specific application. This has resulted in the design and manufacture of a substantial number of components each of which is unique to a particular valve model.

The subject invention overcomes this problem with a single device that generates a detent force which may be simply and easily varied by the operator to adapt to the structural environment as well as the operator's own operational preference. This is accomplished by providing the movable valve control element with an armature that operates in association with a stationary electromagnet, the position of the electromagnet defining a limit position for the valve control element. An electronic circuit including a power transistor generates a current to energize the electromagnets under certain conditions. The magnitude of the transistor output current is controlled through adjustment of a variable resistor connected to the transistor base. The detent assembly is disposed in a housing secured to the valve body, and the variable resistor is accessible for screwdriver adjustment through an opening that is normally sealed.

The inventive apparatus also includes a "feel" mechanism which enables the operator to sense the position of the movable control element, and to determine the point at which the electromagnetic detent will take effect. The "feel" mechanism is also adjustable by the operator through an access opening in accordance with his preference and the environment of use.

As described hereinbelow, it will be appreciated that the electromagnetic detent assembly enables the operator to move the control valve to a detent limit position where it is maintained without further manual contact, and to move the valve out of the limit position with minimum effort. Due to the variable feature, a single device may be used for different valve models having different spring forces.

BRIEF DESCRIPTION OF THE DRAWINGS

FIG. 2 is a detailed view of the control valve and electromagnetic detent, portions thereof broken away and shown in section.

DESCRIPTION OF THE PREFERRED EMBODIMENT

Figure 1:
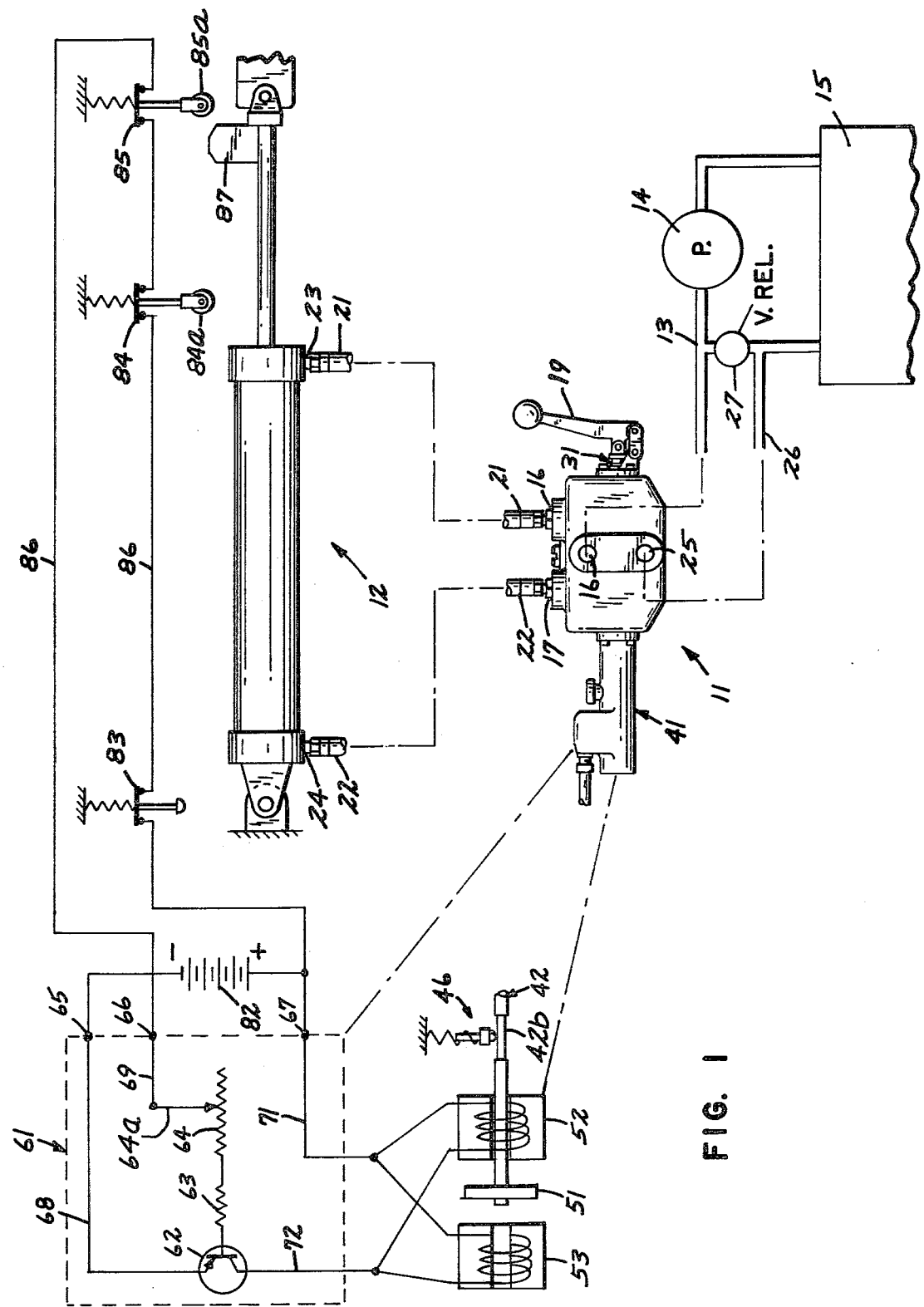
FIG. 1 is a schematic representation of a system including a manually operable control valve having a variable electromagnetic detent.

With reference to FIGS. 1 and 2, a manually operable hydraulic control valve represented generally by the numeral 11 is shown in combination with a hydraulic actuator 12 of the conventional piston-cylinder type. Control valve 11 is supplied with hydraulic fluid under pressure through a line 13 including a pump 14, the inlet side of the pump 14 being in communication with a sump 15.

Generally, hydraulic fluid is received by the valve 11 through an inlet port 16 where it is metered in a desired amount to either of a pair of load ports 17, 18 by operation of a handle 19. Load ports 17, 18 are respectively connected to hydraulic lines 21, 22 to ports 23, 24 of the actuator 12.

Hydraulic valve 11 further includes a return port 25 which communicates with the sump 15 through a hydraulic line 26. A relief valve 27 interconnects hydraulic lines 13 and 26, permitting the release of fluid from hydraulic line 13 to sump 15 when pressure reaches a predetermined maximum level.

With specific reference to FIG. 2, the flow of hydraulic fluid within hydraulic control valve 11 is accomplished by a conventional spool 31 which is pivotally connected at one externally projecting end to the handle 19. As is well known in the hydraulic technology, spool 31 comprises a longitudinal member of circular cross section, selected portions of which are reduced in diameter, as shown by the reference numerals 31a–31d. These stepped down regions serve to control the flow of hydraulic fluid from a hydraulic power loop 32 to either of two outlet passages 33, 34, which respectively lead to the load port 17, 18. Power loop 32 receives hydraulic fluid from inlet 16 through an externally adjustable load check 35.

Hydraulic valve 11 further defines a return loop 36 which, depending on the position of spool 31, receives returned hydraulic fluid from the outlet passage 33 or 34 not in communication with hydraulic power loop 32.

Hydraulic control valve 11 further includes an axially extending housing 41 into which the spool 31 projects. The extreme end of spool 31 defines an additional stepped down region 31e which terminates in the threaded portion 31f. A spool extension represented generally by the numeral 42 is secured to the end of spool 31 by a threaded cap or spud 42a. Cap 42a has an outer cross sectional dimension corresponding generally to the outside diameter of the spool 31, and both define a shoulder relative to the stepped down region 31e. Flanged caps 43, 44 are respectively secured to the spool 31 and threaded cap 42a at these shoulders; and, together with a compression spring 45, define a spring centering mechanism for the spool 31. These components are constructed and disposed so that the spool 31 normally occupies the centered position shown in FIG. 2; i.e., a neutral position where there is no fluid communication between the power loop 32, the outlet passages 33, 34 and the return loop 36.

Intermediate the threaded cap 42a and the opposite end of spool extension 42 is a region 42b of reduced diameter. Cooperating with this region 42b is a "feel" mechanism represented generally by the numeral 46, which enables the valve operator to sense the position of spool 31 as discussed in further detail below. The "feel" mechanism comprises a hollow stem 46a which is slidably disposed in a radial bore in the housing 41. The radial bore extends slightly beyond the axial bore in which the spool extension 42 is disposed, permitting a limited amount of radial travel of the hollow stem 46a. A threaded cap 46b retains the hollow stem 46a in the radial bore and protectively fits over the mechanism.

A first ball member 46c is carried at the bottom of the stem 46a in engaging relation with the stepped region 42b. A second ball member 46d is carried by a piston member 46e, the two members being normally urged into engagement with the stepped region 42b by a compression spring 46f. The degree of compression of spring 46f is determined by adjustment of a threaded screw 46g, which is carried within the upper end of the hollow stem 46a.

The force exerted on the two balls 46c, 46d by spring 46f enables the operator to sense the point at which either of the shoulders at the opposite ends of stepped down region 42b are reached. At this point, fluid communication has already been established between the power loop 32 and one of the outlet passages 33, 34.

With reference to both FIGS. 1 and 2, an armature 51 having a disc configuration is secured to the end of spool extension 42 by a screw or the like. Disposed on each axial side of armature 51 are electromagnets 52, 53, the spool extension 42 passing through a central opening in the electromagnet 52. Electromagnets 52, 53 are of the type that do not generate a magnetic force until contact has been made by the armature 51. The armature 51 and electromagnets 52, 53 are accessible through an end opening in the housing 41 which is normally closed by a threaded plug 54 having a screwdriver slot 54a.

An electrical circuit and component housing represented generally by the numeral 61 is secured within the housing 41 in a radially offset chamber adjacent the armature 51 and electromagnets 52, 53. An external projection 61a is threaded to serve as a mechanical strain relief connector for external electrical components as discussed below.

With reference to FIG. 1, the housing 61 contains electronic circuit components including a transistor 62, a biasing resistor 63 and a variable resistor 64. Variable resistor 64 includes a wiper 64a that is movable to vary its effective resistance. Electrical contacts 65, 66 and 67 are disposed within the threaded projection 61a of housing 61 to receive external electrical connections as will be described below.

An electrical lead 68 connects point 65 with the emitter of transistor 62. An electrical lead 69 connects point 66 with variable resistor 64. An electrical lead 71 commonly connects point 67 with the positive side of the coils of electromagnets 52, 53. An electrical lead 72 connects the collector of transistor 62 with the negative side of the electromagnet coils.

The biasing resistor 63 and variable resistor 64 are connected in series with the base of transistor 62.

With reference to FIG. 2, an adjusting screw 64b for variable resistor 64 is externally accessible through an opening in housing 41. A plug 73 normally seals the access opening. Adjusting screw 64b moves the wiper 64a to determine the effective resistance of variable resistor 64.

A battery 82, which preferably is the 12 volt battery of the vehicle with which the system is used, is electrically connected between contact points 65 and 67 with the polarity arranged as shown in FIG. 1.

Three spring-loaded, normally closed switches 83-85 are connected in series by an electrical lead 86 which defines a loop externally interconnecting point contacts 66 and 67. As connected, switches 83-85 are connected in parallel with the battery 82. Actuation of any of the switches 83-85 interrupts the flow of signal current to the base of transistor 62, thus interrupting current to the electromagnets 52, 53.

Switch 83 is an on-off switch for the system, which may be interconnected with the key switch of the vehicle to prevent current drain when the system is not in use. Switches 84, 85 each includes a roller (reference numerals 84a, 85a, respectively) each of which is engageable by a flag 87 mounted on the piston rod of hydraulic actuator 12. As will be appreciated, the switches 84, 85 are disposed relative to the flag 87 at predetermined limits of travel of the piston rod of actuator 12.

The connection to the negative pole of battery 82 and the opposite ends of lead 86 define contacts which are commonly mounted in a connector (not shown) which screws onto the threaded projection to establish electric contact with points 65-67.

In operation, let it be assumed that the spool 31 is in the centered position shown in FIG. 2, that the switch 83 is closed or "on", and that the piston rod of actuator 12 is extended so that the flag 87 is in engagement with the roller 85a, thus opening switch 85. This interrupts the flow of current to the base of transistor 62 and precludes the generation of an electromagnetic force in either of the electromagnets 52 or 53. The "feel" mechanism 46 is centered relative to the stepped down region 42b, and the armature 51 is centered between the electromagnets 52, 53. Compression spring 45 maintains the spool 31 and spool extension 42 in the centered position.

The piston rod of hydraulic actuator 12 is retracted to accomplish the desired work by the vehicle (e.g., raising the bucket of a front end loader) by manually shifting the handle 19 forward. This moves the spool 31 axially forward until fluid communication is established between the power loop 32 and outlet passage 33 via the stepped down region 31d. Hydraulic fluid is thus applied under pressure from the load port 17 through the hydraulic line 21 to the actuator port 23, causing the piston rod to retract and moving the flag 87 out of engagement with the roller 85a.

At this point, all three switches 83-85 are closed, causing the flow of base current to transistor 62. The magnitude of this current, and hence the magnitude of the transistor collector current flowing to the electromagnets 52, 53, is a function of the electrical potential of battery 82, the value of resistor 63 and the point at which variable resistor 64 is adjusted.

The flow of current in lead 72 energizes electromagnets 52, 53. As the handle 19 is moved forward further, the balls 46c, 46d engage the right shoulder of stepped down region 42b. This provides a "feel" at the handle 19, letting the operator know that further movement will result in electromagnetic detent. Further movement of handle 19 causes the armature 51 to come into contact with electromagnet 53, closing the magnetic circuit around the coil of electromagnet 53, and holding the valve spool 31 in the detent position until the piston rod of actuator 12 is fully retracted. At that point, the flag 87 engages the roller 84a, opening switch 84 and interrupting the flow of base current to transistor 62. In the absence of base current, there is no collector current in lead 72, and both electromagnets 52, 53 are de-energized.

Release of the handle 19 with electromagnets 52, 53 de-energized results in centering of the spool 31 by the compression spring 45. Upon returning to the centered position, the valve 11 is ready for actuation in the opposite direction to extend the piston cylinder of actuator 12. This operation is in essentially the same manner as that described for actuator retraction, although reversed.

Depending on the particular needs of the operator and the application, the variable resistor 64 may be adjusted to vary the holding force by one of the electromagnets 52, 53 on the armature 51. This is accomplished by removing the plug 73 and adjusting the screw 64a.

Similarly, the cap 46b may be removed from the "feel" mechanism 46, and the screw 46g adjusted to vary the "feel" sensed by the operator at the handle 19.

What is claimed is:

1. A hydraulic control device comprising:
   (a) control valve means having fluid inlet and outlet means and including a movable control element for controlling the flow of hydraulic fluid from the inlet means to the outlet means, said control element having at least one limit position;
   (b) electromagnetic magnetic means energizable by electric current and disposed to define said one limit position;
   (c) armature means associated with the control element, the armature means being movable with the control element and disposed for movement into and out of engagement with the electromagnetic means;
   (d) said electromagnetic means being constructed so that, upon energization, it holds the armature means upon being contacted thereby, whereby the control element is held in said limit position;
   (e) electrical circuit means including variable resistor means for varying the current to the electromagnetic means to adjustably vary the magnitude of the force generated by the electromagnetic means, the variable resistor means comprising an externally accessible adjustment screw disposed in a recessed access opening in the device;
   (f) and a removable plug seal for the recessed access opening.

2. The device defined by claim 1, wherein the control valve means comprises biasing means for urging the movable control element to a predetermined normal position.

3. The device defined by claim 2, wherein the fluid outlet means comprises first and second load ports and a return port, and the movable control element comprises a spool member constructed to selectively establish fluid communication between the inlet means and one of the load ports, and between the other load port and the return port.

4. The device defined by claim 3, wherein the biasing means comprises a spring and the predetermined normal position comprises a neutral position where fluid commincation between the inlet means and the respective load and return ports is blocked.

5. The device defined by claim 3, which further comprises hydraulic actuator means operably connected to the load ports, the actuator means having a work element movable in response to increasing or decreasing hydraulic fluid pressure.

6. The device defined by claim 5, wherein the movable work element has at least one limit position, and further comprising switch means for sensing the work element in said limit position and for interrupting the electric current to the electromagnetic means.

7. The device defined by claim 1, and further comprising means for sensing the position of the movable control element and for resisting movement of the control element as it approaches the limit position.

8. A hydraulic control device comprising:
   (a) control valve means comprising
      (i) a fluid inlet, first and second load ports and a return port;
      (ii) and a spool member constructed to selectively establish communication between the inlet and one of the load ports, and between the other load port and the return port, said spool member having at least one limit position;
   (b) electromagnetic means energizable by electric current and disposed to define said one limit position;
   (c) armature means associated with the control element, the armature means being movable with the control element and disposed for movement into and out of engagement with the electromagnetic means;
   (d) said electromagnetic means being constructed so that, upon energization, it holds the armature means upon being contacted thereby, whereby the spool member is held in said limit position;
   (e) electrical circuit means for providing a variable current to the electromagnetic means to adjustably vary the magnitude of the force generated by the electromagnetic means;
   (f) and mechanical means associated with the control element for indicating the proximity of the limit position before the armature reaches the limit position, said mechanical means comprising
      (i) a stepped region on the spool member;
      (ii) and a spring loaded member disposed transversely of the spool member and engageable with the stepped region as it is moved.

9. The device defined by claim 8, wherein the first limit position of the control element corresponds to said spool member position in which said one load port communicates with the inlet means;
   (a) the control element further defining a second limit position spaced from the first limit position, the second limit position corresponding to said spool member position in which said other load port communicates with the inlet means;
   (b) second electromagnetic means energizable by electric current and disposed to define said second limit position;
   (c) said armature means being disposed intermediate the first and second electromagnetic means and movable therebetween for selective engagement therewith, whereby the control element can be selectively retained in either of said limit positions.

10. The apparatus defined by claim 8, which further comprises means for adjusting the spring force of the spring loaded member.

* * * * *